US012790513B2

(12) United States Patent
Moriyasu et al.

(10) Patent No.: US 12,790,513 B2
(45) Date of Patent: Nov. 10, 2026

(54) SURFACE TREATMENT AGENT

(71) Applicant: DAIKIN INDUSTRIES, LTD., Osaka (JP)

(72) Inventors: Reina Moriyasu, Osaka (JP); Satoru Hagita, Osaka (JP); Masamichi Morita, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 635 days.

(21) Appl. No.: 18/201,531

(22) Filed: May 24, 2023

(65) Prior Publication Data

US 2023/0295464 A1 Sep. 21, 2023

Related U.S. Application Data

(63) Continuation of application No. PCT/JP2021/043030, filed on Nov. 24, 2021.

(30) Foreign Application Priority Data

Nov. 25, 2020 (JP) ................................ 2020-195088

(51) Int. Cl.

| | |
|---|---|
| ***C09D 183/08*** | (2006.01) |
| ***C03C 17/30*** | (2006.01) |
| ***C08G 77/26*** | (2006.01) |
| ***C08G 77/54*** | (2006.01) |
| ***C09D 5/00*** | (2006.01) |
| ***C09K 3/18*** | (2006.01) |

(52) U.S. Cl.

CPC ............ *C09D 183/08* (2013.01); *C03C 17/30* (2013.01); *C08G 77/54* (2013.01); *C09D 5/00* (2013.01); *C09K 3/18* (2013.01); *C03C 2217/70* (2013.01); *C03C 2217/732* (2013.01); *C03C 2217/734* (2013.01); *C03C 2217/78* (2013.01); *C03C 2217/948* (2013.01); *C03C 2218/116* (2013.01); *C08G 77/26* (2013.01)

(58) Field of Classification Search

CPC ........ C09D 183/08; C09D 5/00; C08G 77/54; C08G 77/26; C09K 3/18; C03C 17/30; C03C 2217/70; C03C 2217/732; C03C 2217/734; C03C 2217/78; C03C 2217/948; C03C 2218/116

See application file for complete search history.

(56) References Cited

U.S. PATENT DOCUMENTS

| | | | |
|---|---|---|---|
| 3,821,218 | A | 6/1974 | Berger |
| 2011/0008630 | A1 | 1/2011 | Okazaki et al. |
| 2011/0034620 | A1 | 2/2011 | Higuchi |
| 2019/0322893 | A1 | 10/2019 | Nose et al. |
| 2021/0206690 | A1 | 7/2021 | Nose |
| 2021/0206994 | A1 | 7/2021 | Nose et al. |

FOREIGN PATENT DOCUMENTS

| | | | |
|---|---|---|---|
| EP | 2256153 | A1 | 12/2010 |
| EP | 2281857 | A1 | 2/2011 |
| JP | 2001-98221 | A | 4/2001 |
| JP | 2013-213181 | A | 10/2013 |

(Continued)

OTHER PUBLICATIONS

Machine English translation of WO 2020/235524 Fukaumi et al., Nov. 26, 2020.*

(Continued)

*Primary Examiner* — Patrick D Niland
(74) *Attorney, Agent, or Firm* — Sughrue Mion, PLLC

(57) ABSTRACT

A surface-treating agent including (A) a compound represented by the following formula (A1) or formula (A2), and (B) a compound represented by the following formula (B1) or formula (B2), and containing at least one of a compound represented by formula (A2) or a compound represented by formula (B2) as defined herein:

(A1)

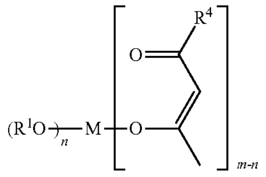

(A2)

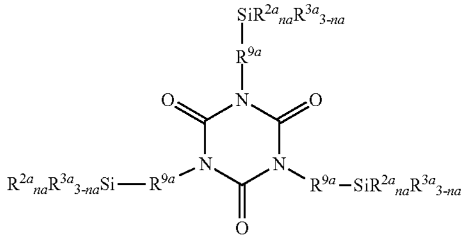

(B1)

$$M^b(OR^{1b})_q(R^{4b})_{p-q}$$

(B2)

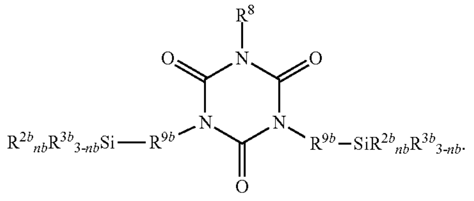

15 Claims, No Drawings

(56) References Cited

FOREIGN PATENT DOCUMENTS

| | | | | | |
|---|---|---|---|---|---|
| JP | 2014-213530 | A | | 11/2014 | |
| WO | 2018/056410 | A1 | | 3/2018 | |
| WO | 2020/066533 | A1 | | 4/2020 | |
| WO | 2020/066534 | A1 | | 4/2020 | |
| WO | WO-2020235524 | A1 | * | 11/2020 | ........... C09D 183/06 |

OTHER PUBLICATIONS

International Search Report for PCT/JP2021/043030 dated Feb. 15, 2022 (PCT/ISA/210).

Extended European Search Report issued Jan. 24, 2025 in Application No. 21897986.2.

International Preliminary Report on Patentability for PCT/JP2021/043030 with a translation of the Written Opinion dated, May 30, 2023.

* cited by examiner

SURFACE TREATMENT AGENT

CROSS REFERENCE TO RELATED APPLICATIONS

This application is a continuation of International Application No. PCT/JP2021/043030 filed Nov. 24, 2021, which claims priority from Japanese Patent Application No. 2020-195088 filed Nov. 25, 2020, the respective disclosures of all of the above of which are incorporated herein by reference in their entirety.

TECHNICAL FIELD

The present disclosure relates to a surface-treating agent and an article having a layer formed of the surface-treating agent.

BACKGROUND ART

It is known that an organic/inorganic hybrid film having, for example, water slipperiness/oil slipperiness, i.e., liquid slipperiness, is obtained by coating the surface of a solid with a solution containing a certain type of organosilane compound and metal alkoxide (Patent Literature 1).

CITATION LIST

Patent Literature

Patent Literature 1: JP 2013-213181 A

SUMMARY

The present disclosure includes the following embodiments.

[1] A surface-treating agent comprising:

(A) a compound represented by the following formula (A1):

(A1)

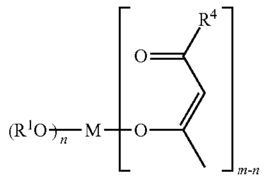

wherein

M is Al, Ca, Fe, Ge, Hf, In, Si, Ta, Ti, Sn, or Zr, $R^1$ is each independently a hydrogen atom or a $C_{1-6}$ alkyl group, $R^4$ is each independently a $C_{1-3}$ alkyl group or a $C_{1-3}$ alkoxy group, m is a valence of M, and n is 0 or more and equal to or less than the valence of M; or a compound represented by the following formula (A2):

(A2)

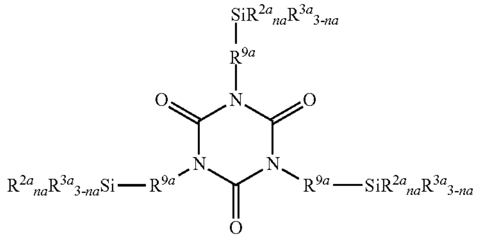

wherein $R^{2a}$ is each independently at each occurrence a hydroxyl group or a hydrolyzable group, $R^{3a}$ is each independently at each occurrence a hydrogen atom or a monovalent organic group, na is each independently an integer of 1 to 3 for each $SiR^{2a}_{na}R^{3a}_{3-na}$ unit, and $R^{9a}$ is each independently a single bond or a divalent group; and (B) a compound represented by the following formula (B1):

$$M^b(OR^{1b})_q(R^{4b})_{p-q} \quad (B1)$$

wherein $M^b$ is Al, Ca, Fe, Ge, Hf, In, Si, Ta, Ti, Sn, or Zr, $R^{1b}$ is each independently a hydrogen atom or a $C_{1-6}$ alkyl group, $R^{4b}$ is a $C_{1-30}$ alkyl group, a $C_{1-30}$ oxyalkyl group, a $C_{1-30}$ fluoroalkyl group, or a siloxane group, p is a valence of $M^b$, and q is 1 or more and equal to or less than (the valence of $M^b$−1); or a compound represented by the following formula (B2):

(B2)

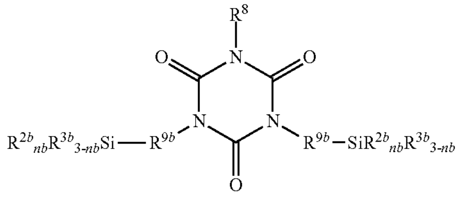

wherein $R^{2b}$ is each independently at each occurrence a hydroxyl group or a hydrolyzable group, $R^{3b}$ is each independently at each occurrence a hydrogen atom or a monovalent organic group, nb is each independently an integer of 1 to 3 for each $SiR^{2b}_{nb}R^{3b}_{3-nb}$ unit, $R^{9b}$ is each independently a single bond or a divalent group, and $R^8$ is a $C_{1-30}$ alkyl group, a $C_{1-30}$ oxyalkyl group, a $C_{1-30}$ fluoroalkyl group, a siloxane-containing group, or a perfluoropolyether-containing group, the surface-treating agent comprising at least one of the compound represented by the formula (A2) or the compound represented by the formula (B2).

Advantageous Effect

According to the present disclosure, it is possible to provide a surface-treating agent capable of forming a surface-treating layer having both liquid slipperiness and UV durability.

DESCRIPTION OF EMBODIMENTS

The term "monovalent organic group", as used herein, refers to a monovalent group containing carbon. The monovalent organic group is not limited, and may be a hydrocarbon group or a derivative thereof. The derivative of the hydrocarbon group refers to a group that has one or more of N, O, S, Si, amide, sulfonyl, siloxane, carbonyl, carbonyloxy, and the like at the terminal or in the molecular chain of the hydrocarbon group. The term simply referred to as an "organic group" means a monovalent organic group. The term "divalent organic group" refers to a divalent group containing carbon. The divalent organic group may be, but is not limited to, a divalent group obtained by further removing one hydrogen atom from an organic group.

The term "hydrocarbon group", as used herein, refers to a group that contains carbon and hydrogen and that is obtained by removing one hydrogen atom from a hydrocarbon. The hydrocarbon group is not limited, and examples include a $C_{1-20}$ hydrocarbon group optionally substituted with one or more substituents, such as an aliphatic hydrocarbon group and an aromatic hydrocarbon group. The "aliphatic hydrocarbon group" may be either linear, branched, or cyclic, and may be either saturated or unsaturated. The hydrocarbon group may contain one or more ring structures.

The substituent of the "hydrocarbon group", as used herein, is not limited, and examples thereof include one or more groups selected from a halogen atom, and a $C_{1-6}$ alkyl group, a $C_{2-6}$ alkenyl group, a $C_{2-6}$ alkynyl group, a $C_{3-10}$ cycloalkyl group, a $C_{3-10}$ unsaturated cycloalkyl group, a 5 to 10-membered heterocyclyl group, a 5 to 10-membered unsaturated heterocyclyl group, a $C_{6-10}$ aryl group, and a 5 to 10-membered heteroaryl group each optionally substituted with one or more halogen atoms.

(Surface-Treating Agent)

The surface-treating agent of the present disclosure comprises:

(A) a compound represented by the following formula (A1):

(A1)

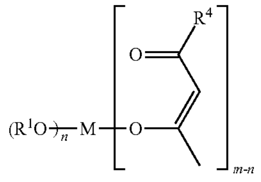

wherein

M is Al, Ca, Fe, Ge, Hf, In, Si, Ta, Ti, Sn, or Zr, $R^1$ is each independently a hydrogen atom or a $C_{1-6}$ alkyl group, $R^4$ is each independently a $C_{1-3}$ alkyl group or a $C_{1-3}$ alkoxy group, m is a valence of M, and n is 0 or more and equal to or less than the valence of M; or a compound represented by formula (A2):

(A2)

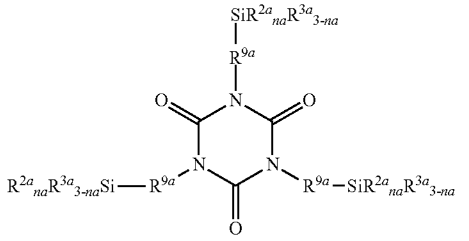

wherein $R^{2a}$ is each independently at each occurrence a hydroxyl group or a hydrolyzable group, $R^{3a}$ is each independently at each occurrence a hydrogen atom or a monovalent organic group, na is each independently an integer of 1 to 3 for each $SiR^{2a}_{na}R^{3a}_{3-na}$ unit, and $R^{9a}$ is each independently a single bond or a divalent group; and (B) a compound represented by the following formula (B1):

$$M^b(OR^{1b})_q(R^{4b})_{p-q} \quad (B1)$$

wherein $M^b$ is Al, Ca, Fe, Ge, Hf, In, Si, Ta, Ti, Sn, or Zr, $R^{1b}$ is each independently a hydrogen atom or a $C_{1-6}$ alkyl group, $R^{4b}$ is a $C_{1-30}$ alkyl group, a $C_{1-30}$ oxyalkyl group, a $C_{1-30}$ fluoroalkyl group, or a siloxane group, p is a valence of $M^b$, and q is 1 or more and equal to or less than (the valence of $M^b-1$); or a compound represented by the following formula (B2):

(B2)

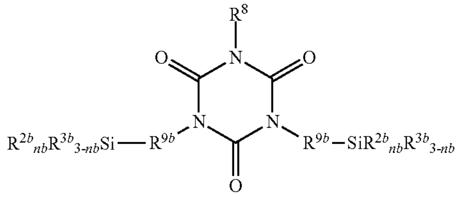

wherein $R^{2b}$ is each independently at each occurrence a hydroxyl group or a hydrolyzable group, $R^{3b}$ is each independently at each occurrence a hydrogen atom or a monovalent organic group, nb is each independently an integer of 1 to 3 for each $SiR^{2b}_{nb}R^{3b}_{3-nb}$ unit, $R^{9b}$ is each independently a single bond or a divalent group, and $R^8$ is a $C_{1-30}$ alkyl group, a $C_{1-30}$ oxyalkyl group, a $C_{1-30}$ fluoroalkyl group, a siloxane-containing group, or a perfluoropolyether-containing group, the surface-treating agent comprising at least one of the compound represented by the formula (A2) or the compound represented by the formula (B2).

(Component (A))

The surface-treating agent of the present disclosure contains a component (A) together with a component (B) wherein the component (A) contains a compound (A2), or the component (B) contains a compound (B2), and, accordingly, the surface-treating agent of the present disclosure is capable of forming a surface-treating layer having excellent liquid slipperiness and UV durability.

The component (A) is a metal alkoxide compound represented by the following formula (A1) (hereinafter also referred to as "a compound (A1)") or an isocyanurate compound represented by the formula (A2) (hereinafter also referred to as "a compound (A2)").

In a preferable embodiment, the compound (A1) is the compound (A1) represented by the formula (A1):

(A1)

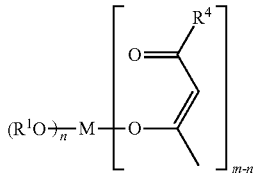

wherein

M is Al, Ca, Fe, Ge, Hf, In, Si, Ta, Ti, Sn, or Zr, $R^1$ is each independently a hydrogen atom or a $C_{1-6}$ alkyl group, and $R^4$ is each independently a $C_{1-3}$ alkyl group or a $C_{1-3}$ alkoxy group, m is a valence of M, and n is 0 or more and equal to or less than the valence of M.

In a more preferable embodiment, the compound (A1) is a compound represented by the formula (A1-1):

$$M(OR^1)_n \qquad (A1\text{-}1)$$

wherein

M is Al, Ca, Fe, Ge, Hf, In, Si, Ta, Ti, Sn, or Zr, $R^1$ is each independently a hydrogen atom or a $C_{1-6}$ alkyl group, and n is a valence of M.

In a more preferable embodiment, the compound (A1) is a metal alkoxide represented by the formula (A1-2):

$$Si(OR^1)_4 \qquad (A1\text{-}2)$$

wherein $R^1$ is each independently a hydrogen atom or a $C_{1-6}$ alkyl group.

In the present disclosure, typically, Al is trivalent, Ca is divalent, Fe is divalent or trivalent, and preferably trivalent, Ge is divalent or tetravalent, and preferably tetravalent, Hf is tetravalent, In is tetravalent, Si is tetravalent, Ta is pentavalent, Ti is tetravalent, Sn is tetravalent, and Zr is tetravalent.

M is preferably Si, Ti, or Zr, and more preferably Si.

$R^1$ is each independently preferably a $C_{1-6}$ alkyl group, more preferably a $C_{1-3}$ alkyl group, and even more preferably a $C_{1-2}$ alkyl group.

$R^4$ is each independently a $C_{1-3}$ alkyl group or a $C_{1-3}$ alkoxy group.

The alkyl group of $R^4$ is preferably a methyl group or an ethyl group, and more preferably a methyl group.

The alkoxy group of $R^4$ is preferably a methoxy group or an ethoxy group, and more preferably an ethoxy group.

m is the valence of M, and n is 0 or more and equal to or less than the valence of M.

In one embodiment, n is the valence of M.

In another embodiment, (m-n) is 1.

In a preferable embodiment, the compound (A1) is tetramethoxysilane or tetraethoxysilane.

The compound (A2) is an isocyanurate compound that has three hydrolyzable silane groups and that is represented by the formula (A2):

(A2)

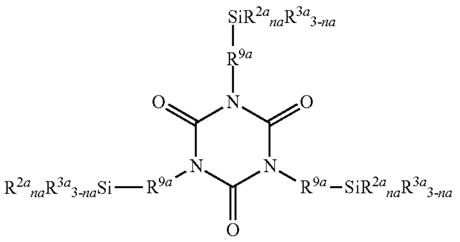

wherein $R^{2a}$ is each independently at each occurrence a hydroxyl group or a hydrolyzable group, $R^{3a}$ is each independently at each occurrence a hydrogen atom or a monovalent organic group, na is each independently an integer of 1 to 3 for each $SiR^{2a}_{na}R^{3a}_{3-na}$ unit, and $R^{9a}$ is each independently a single bond or a divalent group.

Containing the compound (A2), the surface-treating agent of the present disclosure can form a surface-treating layer having excellent UV durability.

The compound (A2) has 3 mono- to tri-functional silane groups. Here, the "mono- to tri-functional silane group" refers to a silane group having 1 to 3 functional groups or, typically, hydroxyl groups or hydrolyzable groups.

In the above formula, $R^{2a}$ is each independently at each occurrence a hydroxyl group or a hydrolyzable group.

Preferably, $R^{2a}$ is each independently at each occurrence a hydrolyzable group.

Here, the "hydrolyzable group" refers to a group capable of undergoing a hydrolysis reaction, i.e., refers to a group that can be eliminated from the main backbone of a compound by a hydrolysis reaction. Examples of the hydrolyzable group include $-OR^h$, $-OCOR^h$, $-O-N=CR^h_2$, $-NR^h_2$, $-NHR^h$, —NCO, and halogen. Examples of $R^h$ include substituted or unsubstituted $C_{1-4}$ alkyl groups, e.g., unsubstituted alkyl groups such as a methyl group, an ethyl group, a propyl group, an isopropyl group, a n-butyl group, and an isobutyl group; and substituted alkyl groups such as a chloromethyl group. Among them, an alkyl group, particularly an unsubstituted alkyl group, is preferable, and a methyl group or an ethyl group is more preferable. In one embodiment, $R^h$ is a methyl group, and in another embodiment, $R^h$ is an ethyl group.

$R^{2a}$ is more preferably $-OR^h$ (i.e., an alkoxy group).

In the above formula, $R^{3a}$ is each independently at each occurrence a hydrogen atom or a monovalent organic group.

The monovalent organic group is a monovalent organic group excluding the hydrolyzable group.

In $R^{3a}$, the monovalent organic group is preferably a $C_{1-20}$ alkyl group, more preferably a $C^{1-6}$ alkyl group, even more preferably a $C^{1-3}$ alkyl group, and particularly preferably a methyl group.

In the formula, na is each independently an integer of 1 to 3 for each $(SiR^{2a}_{na}R^{3a}_{3-na})$ unit. That is to say, the silane group in the compound (A2) is a mono- to tri-functional silane group. na is preferably 2 or 3, and more preferably 3. That is to say, the silane group in the compound (A2) is preferably a di- to tri-functional silane group, and more preferably a trifunctional silane group.

In one embodiment, $R^{9a}$ is each independently a single bond or a divalent organic group.

In a preferable embodiment, $R^{9a}$ is each independently a single bond or a divalent group represented by the following formula:

$$—R^{41}_{x6}—R^{42}_{x7}—$$

wherein $R^{41}$ represents $—(CH_2)_{y6}—$ or an o-, m- or p-phenylene group, and preferably $—(CH_2)_{y6}—$, $y^6$ is an integer of 1 to 20, preferably an integer of 1 to 6, and more preferably an integer of 1 to 3, $R^{42}$ is a group selected from the group consisting of —O—, —S—, an o-, m- or p-phenylene group, —C(O)O—, —OC(O)—, $—CONR^{45}—$, $—NR^{45}CO—$, $—O—CONR^{45}—$, $—NR^{45}CO—O—$, $—NR^{45}—$, $—NR^{45}CONR^{45}—$, $—SO_2NR^{45}—$, $—NR^{45}SO_2—$, $—SO_2$, and $—(CH_2)_{y7}—$, $R^{45}$ is each independently a hydrogen atom, a phenyl group, or a $C_{1-6}$ alkyl group (preferably a $C_{1-2}$ alkyl group, more preferably a methyl group), y7 is an integer of 1 to 20, preferably an integer of 1 to 6, and more preferably an integer of 1 to 3, x6 is an integer of 0 to 2, x7 is 0 or 1, provided that at least one of x6 and x7 is not 0, and the occurrence order of the respective repeating units $R^{41}$ and $R^{42}$ that are provided with x6 and x7 is not limited.

The left side of the group binds to the Si atom, and the right side binds to N of the isocyanurate ring. Here, $R^{9a}$ (typically, a hydrogen atom of $R^{9a}$) is optionally substituted with one or more substituents selected from a fluorine atom, a $C_{1-3}$ alkyl group, and a $C_{1-3}$ fluoroalkyl group. In a preferable embodiment, $R^{9a}$ is not substituted with these groups.

In a preferable embodiment, $R^{9a}$ is $—(CH_2)_{y6}—$ (wherein y6 is an integer of 1 to 6).

In a preferable embodiment, $R^{2a}$ is a methoxy group or an ethoxy group, na is 3, and $R^{9a}$ is a $C_{1-6}$ alkylene group.

(Component (B))

The surface-treating agent of the present disclosure contains a component (B) together with a component (A) wherein the component (B) is a compound (B2), or the component (A) is a compound (A2), and, accordingly, the surface-treating agent of the present disclosure is capable of forming a surface-treating layer having excellent liquid slipperiness and UV durability.

The component (B) is a metal alkoxide compound represented by the following formula (B1) (hereinafter also referred to as "a compound (B1)") or an isocyanurate compound represented by the formula (B2) (hereinafter also referred to as "a compound (B2)").

The compound (B1) is a metal alkoxide represented by the formula (B1):

$$M^b(OR^{1b})_q(R^{4b})_{p-q} \quad (B1)$$

wherein $M^b$ is Al, Ca, Fe, Ge, Hf, In, Si, Ta, Ti, Sn, or Zr, $R^{1b}$ is each independently a hydrogen atom or a $C_{1-6}$ alkyl group, $R^{4b}$ is a $C_{1-30}$ alkyl group, a $C_{1-30}$ oxyalkyl group, a $C_{1-30}$ fluoroalkyl group, or a siloxane group, p is a valence of $M^b$, and q is 1 or more and equal to or less than (the valence of $M^b$-1).

The compound (B1) has a metal atom, an alkoxide group bonded to the metal atom, and a functional group that imparts liquid slipperiness.

$M^b$ is preferably Si, Ti, or Zr, and more preferably Si.

$R^{1b}$ is each independently preferably a $C_{1-6}$ alkyl group, more preferably a $C_{1-3}$ alkyl group, and even more preferably a $C_{1-2}$ alkyl group.

$R^{4b}$ is a $C_{1-30}$ alkyl group, a $C_{1-30}$ oxyalkyl group, a $C_{1-30}$ fluoroalkyl group, or a siloxane group.

The $C_{1-50}$ alkyl group may be linear or branched.

The $C_{1-30}$ alkyl group is preferably a $C_{3-25}$ alkyl group, more preferably a $C_{6-25}$ alkyl group, even more preferably a $C_{8-20}$ alkyl group, and yet more preferably a $C_{8-16}$ alkyl group.

The $C_{1-30}$ oxyalkyl group is preferably a $C_{3-30}$ oxyalkyl group, more preferably a $C_{7-25}$ oxyalkyl group, even more preferably a $C_{8-20}$ oxyalkyl group, and yet more preferably a $C_{8-16}$ oxyalkyl group.

The $C_{1-30}$ fluoroalkyl group is preferably a $C_{3-25}$ fluoroalkyl group, more preferably a $C_{6-25}$ fluoroalkyl group, even more preferably a $C_{8-20}$ fluoroalkyl group, and yet more preferably a $C_{8-16}$ fluoroalkyl group. The fluoroalkyl group may be partially fluorinated or completely fluorinated.

The siloxane group is a group represented by the following formula:

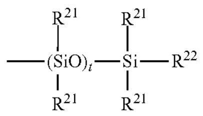

wherein $R^{21}$ is each independently at each occurrence a hydrogen atom or a $C_{1-6}$ alkyl group, $R^{22}$ is a hydrogen atom or a $C_{1-6}$ alkyl group, and t is an integer of 1 to 200.

The $C_{1-6}$ alkyl group of $R^{21}$ is preferably a $C_{1-3}$ alkyl group, and more preferably a methyl group.

The $C_{1-6}$ alkyl group of $R^{22}$ is preferably a $C_{1-3}$ alkyl group, and more preferably a methyl group.

In a preferable embodiment, $R^{21}$ and $R^{22}$ are each independently a $C_{1-6}$ alkyl group.

t is preferably an integer of 1 to 100, and more preferably an integer of 5 to 100.

In a preferable embodiment, $R^{4b}$ is a $C_{1-30}$ alkyl group.

p is a valence of $M^b$, and q is 1 or more and equal to or less than (the valence of $M^b$-1).

In one embodiment, (p-q) is 1.

In a preferable embodiment, $M^b$ is Si, $R^{1b}$ is a methyl group or an ethyl group, $R^{4b}$ is a $C_{1-30}$ alkyl group and preferably a $C_{8-20}$ alkyl group, p is 4, and q is 3.

The compound (B2) is an isocyanurate compound that has two hydrolyzable silane groups and that is represented by the formula (B2):

(B2)

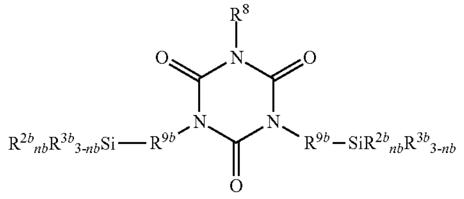

wherein $R^{2b}$ is each independently at each occurrence a hydroxyl group or a hydrolyzable group, $R^{3b}$ is each independently at each occurrence a hydrogen atom or a monovalent organic group, nb is each independently an integer of 1 to 3 for each $SiR^{2b}_{nb}R^{3b}_{3-nb}$ unit, $R^{9b}$ is each independently a single bond or a divalent group, and $R^8$ is a $C_{1-30}$ alkyl group, a $C_{1-30}$ oxyalkyl group, a $C_{1-30}$ fluoroalkyl group, a siloxane-containing group, or a perfluoropolyether-containing group.

Containing the compound (B2), the surface-treating agent of the present disclosure can form a surface-treating layer having excellent liquid slipperiness and UV durability.

The compound (B2) has two mono- to tri-functional silane groups.

In the formula, $R^{2b}$ is each independently at each occurrence a hydroxyl group or a hydrolyzable group.

Preferably, $R^{2b}$ is each independently at each occurrence a hydrolyzable group.

Here, the "hydrolyzable group" refers to a group capable of undergoing a hydrolysis reaction, i.e., refers to a group that can be eliminated from the main backbone of a compound by a hydrolysis reaction. Examples of the hydrolyzable group include $—OR^h$, $—OCOR^h$, $—O—N{=}CR^h_2$, $—NR^h_2$, $—NHR^h$, —NCO, and halogen. Examples of $R^h$ include substituted or unsubstituted $C_{1-4}$ alkyl groups, e.g., unsubstituted alkyl groups such as a methyl group, an ethyl group, a propyl group, an isopropyl group, a n-butyl group, and an isobutyl group; and substituted alkyl groups such as a chloromethyl group. Among these, an alkyl group, particularly an unsubstituted alkyl group is preferable, and a methyl group or an ethyl group is more preferable. In one embodiment, $R^h$ is a methyl group, and in another embodiment, $R^h$ is an ethyl group.

$R^{2b}$ is more preferably $—OR^h$ (i.e., an alkoxy group).

In the formula, $R^{3b}$ is each independently at each occurrence a hydrogen atom or a monovalent organic group. The monovalent organic group is a monovalent organic group excluding the hydrolyzable group.

In $R^{3b}$, the monovalent organic group is preferably a $C_{1-20}$ alkyl group, more preferably a $C_{1-6}$ alkyl group, even more preferably a $C_{1-3}$ alkyl group, and particularly preferably a methyl group.

In the formula, nb is each independently an integer of 1 to 3 for each $(SiR^{2b}_{nb}R^{3b}_{3-nb})$ unit. That is to say, the silane group in the compound (B2) is a mono- to tri-functional silane group. nb is preferably 2 or 3, and more preferably 3. That is to say, the silane group in the compound (B2) is preferably a di- to tri-functional silane group, and more preferably a trifunctional silane group.

In one embodiment, $R^{9b}$ is each independently a single bond or a divalent group represented by the following formula:

$$—R^{41}_{x6}—R^{42}_{x7}—$$

wherein $R^{41}$ represents $—(CH_2)_{y6}—$ or an o-, m- or p-phenylene group, and preferably $—(CH_2)_{y6}—$, y6 is an integer of 1 to 20, preferably an integer of 1 to 6, and more preferably an integer of 1 to 3, $R^{42}$ is a group selected from the group consisting of —O—, —S—, an o-, m- or p-phenylene group, —C(O)O—, —OC(O)—, $—CONR^{45}—$, $—NR^{45}CO—$, $—O—CONR^{45}—$, $—NR^{45}CO—O—$, $—NR^{45}—$, $—NR^{45}CONR^{45}—$, $—SO_2NR^{45}—$, $—NR^{45}SO_2—$, $—SO_2$, and $—(CH_2)_{y7}—$, $R^{45}$ is each independently a hydrogen atom, a phenyl group, or a $C_{1-6}$ alkyl group (preferably a $C_{1-2}$ alkyl group, more preferably a methyl group), y7 is an integer of 1 to 20, preferably an integer of 1 to 6, and more preferably an integer of 1 to 3, x6 is an integer of 0 to 2, x7 is 0 or 1, provided that at least one of x6 and x7 is not 0, and the occurrence order of the respective repeating units $R^{41}$ and $R^{42}$ that are provided with x6 and x7 is not limited. The left side of the group binds to the Si atom, and the right side binds to N of the isocyanurate ring. Here, $R^{9b}$ (typically, a hydrogen atom of $R^{9b}$) is optionally substituted with one or more substituents selected from a fluorine atom, a $C_{1-3}$ alkyl group, and a $C_{1-3}$ fluoroalkyl group. In a preferable embodiment, $R^{9b}$ is not substituted with these groups.

In a preferable embodiment, $R^{9b}$ is $—(CH_2)_{y6}—$ (wherein y6 is an integer of 1 to 6).

$R^8$ is a $C_{1-30}$ alkyl group, a $C_{1-30}$ oxyalkyl group, a $C_{1-30}$ fluoroalkyl group, a siloxane-containing group, or a perfluoropolyether-containing group.

The $C_{1-30}$ alkyl group, $C_{1-30}$ oxyalkyl group, and $C_{1-30}$ fluoroalkyl group have the same meanings as the $C_{1-30}$ alkyl group, $C_{1-30}$ oxyalkyl group, and $C_{1-30}$ fluoroalkyl group of $R^{4b}$.

The siloxane-containing group is a group containing a siloxane group, and preferably a group represented by $—X^5—R^5$ (wherein $X^5$ is a single bond or a divalent organic group, and $R^5$ is a siloxane group).

In one embodiment, $X^5$ is a single bond.

In another embodiment, $X^5$ is a divalent organic group.

The divalent organic group is preferably a $C_{1-6}$ alkylene group, $—(CH_2)_{z1}—O—(CH_2)_{z2}—$ (wherein z1 is an integer of 0 to 6 such as an integer of 1 to 6, and z2 is an integer of 0 to 6 such as an integer of 1 to 6), or $—(CH_2)_{z3}$-phenylene-$(CH_2)_{z4}—$ (wherein z3 is an integer of 0 to 6 such as an integer of 1 to 6, and z4 is an integer of 0 to 6 such as an integer of 1 to 6). Such a $C_{1-6}$ alkylene group may be linear or branched, and is preferably linear. These groups may be optionally substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted. The divalent organic group is preferably a $C_{1-6}$ alkylene group.

The siloxane group has the same meaning as the siloxane group of $R^{4b}$.

The perfluoropolyether-containing group is a group containing a perfluoropolyether group, and preferably a group represented by $—X^{PF}—R^{PF}$ (wherein $X^{PF}$ is a single bond or a divalent organic group, and $R^{PF}$ is a perfluoropolyether group).

In one embodiment, $X^{PF}$ is a single bond.

In another embodiment, $X^{PF}$ is a divalent organic group.

The divalent organic group is preferably a $C_{1-6}$ alkylene group, $—(CH_2)_{z5}—O—(CH_2)_{z6}—$ (wherein z5 is an integer of 0 to 6 such as an integer of 1 to 6, and z6 is an integer of 0 to 6 such as an integer of 1 to 6), or $-(CH_2)_{z7}$-phenylene-$(CH_2)_{z8}-$ (wherein z7 is an integer of 0 to 6 such as an integer of 1 to 6, and z8 is an integer of 0 to 6 such as an integer of 1 to 6). Such a $C_{1-6}$ alkylene group may be linear or branched, and is preferably linear. These groups may be optionally substituted with, for example, one or more substituents selected from a fluorine atom, a $C_{1-6}$ alkyl group, a $C_{2-6}$ alkenyl group, and a $C_{2-6}$ alkynyl group, and are preferably unsubstituted. The divalent organic group is preferably a $C_{1-6}$ alkylene group.

The perfluoropolyether group is preferably a group represented by:

$$Rf^1-R^F-O_q-$$

wherein

- $Rf^1$ is each independently at each occurrence a $C_{1-16}$ perfluoroalkyl group,
- $R^F$ is each independently at each occurrence a divalent fluoropolyether group, and
- q is 0 or 1.

The $C_{1-16}$ perfluoroalkyl group may be linear or branched, and is preferably a linear or branched $C_{1-6}$ perfluoroalkyl group, in particular $C_{1-3}$ perfluoroalkyl group, more preferably a linear $C_{1-6}$ perfluoroalkyl group, in particular $C_{1-3}$ perfluoroalkyl group, and specifically $-CF_3$, $-CF_2CF_3$, or $-CF_2CF_2CF_3$.

In the formula, q is each independently at each occurrence 0 or 1. In one embodiment, q is 0. In another embodiment, q is 1.

In the formula, $R^F$ is each independently at each occurrence a divalent perfluoropolyether group.

$R^F$ is preferably a group represented by the formula:

$$-(OC_6F_{12})_a-(OC_5F_{10})_b-(OC_4F_8)_c-(OC_3F_6)_d-(OC_2F_4)_e-(OCF_2)_f-$$

wherein a, b, c, d, e, and f are each independently an integer of 0 to 200, the sum of a, b, c, d, e, and f is 1 or more; and the occurrence order of the respective repeating units enclosed in parentheses provided with a, b, c, d, e, or f is not limited in the formula. provided that when all $R^{Fa}$ are hydrogen atoms or chlorine atoms, at least one of a, b, c, e, and f is 1 or more.

Preferably, a, b, c, d, e, and f may be each independently an integer of 0 to 100.

The sum of a, b, c, d, e, and f is preferably 5 or more, and more preferably 10 or more, and may be, for example, 15 or more or 20 or more. The sum of a, b, c, d, e, and f is preferably 200 or less, more preferably 100 or less, and even more preferably 60 or less, and may be, for example, 50 or less or 30 or less.

These repeating units may be linear or branched. For example, $-(OC_6F_{12})-$ may be $-(OCF_2CF_2CF_2CF_2CF_2CF_2)-$, $-(OCF(CF_3)CF_2CF_2CF_2CF_2)-$, $-(OCF_2CF(CF_3)CF_2CF_2CF_2)-$, $-(OCF_2CF_2CF(CF_3)CF_2CF_2)-$, $-(OCF_2CF_2CF_2CF(CF_3)CF_2)-$, $-(OCF_2CF_2CF_2CF_2CF(CF_3))-$, or the like. $-(OC_5F_{10})-$ may be $-(OCF_2CF_2CF_2CF_2CF_2)-$, $(OCF_2CF(CF_3)CF_2CF_2)-$, $-(OCF(CF_3)CF_2CF_2CF_2)-$, $-(OCF_2CF_2CF(CF_3)CF_2)-$, $(OCF_2CF_2CF_2CF(CF_3))-$, or the like. $-(OC_4F_8)-$ may be any of $-(OCF_2CF_2CF_2CF_2)-$, $-(OCF(CF_3)CF_2CF_2)-$, $-(OCF_2CF(CF_3)CF_2)-$, $-(OCF_2CF_2CF(CF_3))-$, $-(OC(CF_3)_2CF_2)-$, $-(OCF_2C(CF_3)_2)-$, $-(OCF(CF_3)CF(CF_3))-$, $-(OCF(C_2F_5)CF_2)-$, and $-(OCF_2CF(C_2F_5))-$, $-(OC_3F_6)-$ (i.e., in the above formula, $R^{Fa}$ is a fluorine atom) may be any of $-(OCF_2CF_2CF_2)-$, $-(OCF(CF_3)CF_2)-$, and $-(OCF_2CF(CF_3))-$. $-(OC_2F_4)-$ may be any of $-(OCF_2CF_2)-$ and $-(OCF(CF_3))-$.

In one embodiment, $R^F$ is each independently at each occurrence a group represented by any of the following formulae (f1) to (f5):

$$-(OC_3F_6)_d-(OC_2F_4)_e- \quad (f1)$$

wherein d is an integer of 1 to 200, and e is 0 or 1;

$$-(OC_4F_8)_c-(OC_3F_6)_d-(OC_2F_4)_e-(OCF_2)_f- \quad (f2)$$

wherein c and d are each independently an integer of 0 or more and 30 or less, e and f are each independently an integer of 1 or more and 200 or less, the sum of c, d, e, and f is 2 or more, and the occurrence order of the respective repeating units enclosed in parentheses provided with a subscript c, d, e, or f is not limited in the formula;

$$-(R^6-R^7)_g- \quad (f3)$$

wherein $R^6$ is $OCF_2$ or $OC_2F_4$, $R^7$ is a group selected from $OC_2F_4$, $OC_3F_6$, $OC_4F_8$, $OC_5F_{10}$, and $OC_6F_{12}$, or is a combination of two or three groups independently selected from these groups, and g is an integer of 2 to 100;

$$-(OC_6F_{12})_a-(OC_5F_{10})_b-(OC_4F_8)_c-(OC_3F_6)_d-(OC_2F_4)_e-(OCF_2)_f- \quad (f4)$$

wherein e is an integer of 1 or more and 200 or less; a, b, c, d, and f are each independently an integer of 0 or more and 200 or less; and the occurrence order of the respective repeating units enclosed in parentheses provided with a, b, c, d, e, or f is not limited in the formula; and $$-(OC_6F_{12})_a-(OC_5F_{10})_b-(OC_4F_8)_c-(OC_3F_6)_d-(OC_2F_4)_e-(OCF_2)_f- \quad (f5)$$

wherein f is an integer of 1 or more and 200 or less; a, b, c, d, and e are each independently an integer of 0 or more and 200 or less; and the occurrence order of the respective repeating units enclosed in parentheses provided with a, b, c, d, e, or f is not limited in the formula.

In the formula (f1), d is preferably 5 to 200, more preferably 10 to 100, and even more preferably 15 to 50, and is, for example, an integer of 25 to 35. In one embodiment, e is 1. In another embodiment, e is 0. In the formula (f1), $-(OC_3F_6)_d-$ is preferably a group represented by $-(OCF_2CF_2CF_2)_d-$, $-(OCF(CF_3)CF_2)_d-$, or $-(OCF_2CF(CF_3))_d-$, and more preferably a group represented by $-(OCF_2CF_2CF_2)_d-$.

In the formula (f2), e and f are each independently an integer of preferably 5 to 200, and more preferably 10 to 200. The sum of c, d, e, and f is preferably 5 or more, and more preferably 10 or more, and may be, for example, 15 or more or 20 or more. In one embodiment, the formula (f2) is preferably a group represented by $-(OCF_2CF_2CF_2CF_2)_c-(OCF_2CF_2CF_2)_d-(OCF_2CF_2)_e-(OCF_2)_f-$. In another embodiment, the formula (f2) may be a group represented by $-(OC_2F_4)_e-(OCF_2)_f-$.

In the formula (f3), $R^6$ is preferably $OC_2F_4$. In the formula (f3), $R^7$ is preferably a group selected from $OC_2F_4$, $OC_3F_6$, and $OC_4F_8$, or a combination of two or three groups independently selected from these groups, and more preferably a group selected from $OC_3F_6$ and $OC_4F_8$. Examples of the combination of two or three groups independently selected from $OC_2F_4$, $OC_3F_6$, and $OC_4F_8$ are not limited, but include $-OC_2F_4OC_3F_6$, $-OC_2F_4OC_4F_8$, $-OC_3F_6OC_2F_4$, $OC_3F_6OC_3F_6$, $OC_3F_6OC_4F_8$, $OC_4F_8OC_4F_8$, $—OC_4F_8OC_3F_6$, $—OC_4F_8OC_2F_4$, $OC_2F_4OC_2F_4OC_3F_6$, $—OC_2F_4OC_2F_4OC_4F_8$, $—OC_2F_4OC_3F_6OC_2F_4$, $OC_2F_4OC_3F_6OC_3F_6—$, $—OC_2F_4OC_4F_8OC_2F_4$, $OC_3F_6OC_2F_4OC_2F_4$, $OC_3F_6OC_2F_4OC_3F_6$, $OC_3F_6OC_3F_6OC_2F_4—$, and $—OC_4F_8OC_2F_4OC_2F_4—$. In the formula (f3), g is an integer of preferably 3 or more, and more preferably 5 or more. g is preferably an integer of 50 or less. In the formula (f3), $OC_2F_4$, $OC_3F_6$, $OC_4F_8$, $OC_5F_{10}$, and $OC_6F_{12}$ may be either linear or branched, and are preferably linear. In this embodiment, the formula (f3) is preferably $—(OC_2F_4—OC_3F_6)_g—$ or $—(OC_2F_4—OC_4F_8)_g—$.

In the formula (f4), e is an integer of preferably 1 or more and 100 or less, and more preferably 5 or more and 100 or less. The sum of a, b, c, d, e, and f is preferably 5 or more, and more preferably 10 or more, for example, 10 or more and 100 or less.

In the formula (f5), f is an integer of preferably 1 or more and 100 or less, and more preferably 5 or more and 100 or less. The sum of a, b, c, d, e, and f is preferably 5 or more, and more preferably 10 or more, for example, 10 or more and 100 or less.

In one embodiment, $R^F$ is a group represented by the formula (f1).

In one embodiment, $R^F$ is a group represented by the formula (f2).

In one embodiment, $R^F$ is a group represented by the formula (f3).

In one embodiment, $R^F$ is a group represented by the formula (f4).

In one embodiment, $R^F$ is a group represented by the formula (f5).

In a preferable embodiment, $R^8$ is a $C_{1-30}$ alkyl group, and preferably a $C_{8-20}$ alkyl group.

In a preferable embodiment, $R^{2b}$ and $R^{3b}$ are methoxy or ethoxy groups, nb is 3, $R^{9b}$ is a $C_{1-6}$ alkylene group, and $R^8$ is a $C_{1-30}$ alkyl group, and preferably a $C_{8-20}$ alkyl group.

The surface-treating agent of the present disclosure contains at least one of the compound represented by the formula (A2) or the compound represented by the formula (B2). When the compound represented by the formula (A2) or the compound represented by the formula (B2) is contained, UV durability is more increased.

In one embodiment, the surface-treating agent of the present disclosure contains the compound represented by the formula (B2). When the compound represented by the formula (B2) is contained, UV durability and liquid slipperiness are more increased.

In one embodiment, the molar ratio of the component (A) to the component (B) (component (A):component (B)) is preferably 0.01-100:1, more preferably 1-100:1, and even more preferably 4-50:1, and yet more preferably 5-20:1. With the molar ratio of the component (A) to the component (B) being within the above range, better liquid slipperiness and UV durability can be imparted. Here, when the component (A) and the component (B) each contains two or more kinds of compounds, the molar ratio is calculated based on the total amounts thereof.

In one embodiment, the component (A) is a compound (A1).

In another embodiment, the component (A) is a compound (A2).

In another embodiment, the component (A) is a compound (A1) and a compound (A2).

In one embodiment, the component (B) is a compound (B1).

In another embodiment, the component (B) is a compound (B2).

In another embodiment, the component (B) is a compound (B1) and a compound (B2).

In one embodiment, the component (A) is a compound (A1), and the component (B) is a compound (B2).

In another embodiment, the component (A) is a compound (A1), and the component (B) is a compound (B1) and a compound (B2).

In one embodiment, the component (A) is a compound (A2), and the component (B) is a compound (B1).

In another embodiment, the component (A) is a compound (A2), and the component (B) is a compound (B2).

In another embodiment, the component (A) is a compound (A1) and a compound (A2), and the component (B) is a compound (B1).

In another embodiment, the component (A) is a compound (A1) and a compound (A2), and the component (B) is a compound (B2).

In one embodiment, the component (A) is a compound (A1) and a compound (A2), and the component (B) is a compound (B1) and a compound (B2).

In one embodiment, the surface-treating agent of the present disclosure does not contain a vinyl polymer or, in particular, a vinyl polymer containing a silyl group.

When the component (A) contains a compound (A1) and a compound (A2), the ratio of the compound (A1) to the compound (A2) is preferably 1:10 to 10:1, more preferably 1:5 to 5:1, and more preferably 1:3 to 3:1.

When the component (A) contains a compound (A1), and the component (B) contains a compound (B2), the ratio of the compound (A1) to the compound (B2) (compound (A1):compound (B2)) is preferably 1:10 to 10:1, more preferably 1:5 to 5:1, and more preferably 1:3 to 3:1. With the ratio of the compound (A1) to the compound (B2) being within the above range, the liquid slipperiness and the UV durability of the surface-treating layer is more increased.

When the component (B) contains a compound (B1) and a compound (B2), the ratio of the compound (B1) to the compound (B2) (compound (B1):compound (B2)) is preferably 1:10 to 10:1, more preferably 1:5 to 5:1, and more preferably 1:3 to 3:1. With the ratio of the compound (B1) to the compound (B2) being within the above range, the liquid slipperiness and the UV durability of the surface-treating layer is more increased.

When the component (A) contains a compound (A1), and the component (B) contains a compound (B1) and a compound (B2), the ratio of the sum of the compound (A1) and the compound (B1) to the compound (B2) ({compound (A1)+compound (B1)}:compound (B2)) is preferably 1:10 to 10:1, more preferably 1:5 to 5:1, and more preferably 1:3 to 3:1. With the ratio of the compound (A1) to the compound (B2) being within the above range, the liquid slipperiness and the UV durability of the surface-treating layer is more increased.

In the surface-treating agent of the present disclosure, the component (A) and the component (B) may be preferably 0.1 to 80 mass %, more preferably 1 to 50 mass %, and even more preferably 2 to 30 mass % in total.

The surface-treating agent of the present disclosure may further contain one or more other components selected from an organic solvent, water, and a catalyst.

Examples of the organic solvent include fluorine-containing organic solvents and fluorine-free organic solvents.

Examples of the fluorine-containing organic solvents include perfluorohexane, perfluorooctane, perfluorodimethyl cyclohexane, perfluorodecalin, perfluoroalkyl ethanol, perfluorobenzene, perfluorotoluene, perfluoroalkyl amine (e.g., Fluorinert (trade name)), perfluoroalkyl ether, perfluorobutyl tetrahydrofuran, polyfluoroaliphatic hydrocarbons (ASAHIKLIN AC6000 (trade name)), hydrochlorofluorocarbons (e.g., ASAHIKLIN AK-225 (trade name)), hydrofluoroether (e.g., Novec (trade name), HFE-7100 (trade name), HFE-7300 (trade name)), 1,1,2,2,3,3,4-heptafluorocyclopentane, fluorine-containing alcohols, perfluoroalkyl bromide, perfluoroalkyl iodide, perfluoropolyether (e.g., Krytox (trade name), Demnum (trade name), Fomblin (trade name)), 1,3-bistrifluoromethylbenzene, 2-(perfluoroalkyl) ethyl methacrylate, 2-(perfluoroalkyl)ethyl acrylate, perfluoroalkyl ethylene, chlorofluorocarbon 134a, and hexafluoropropene oligomers.

Examples of the fluorine-free organic solvents include acetone, methyl isobutyl ketone, cyclohexanone, propylene glycol monomethyl ether, propylene glycol monoethyl ether, propylene glycol monobutyl ether, propylene glycol monomethyl ether acetate, propylene glycol monoethyl ether acetate, propylene glycol monobutyl ether acetate, dipropylene glycol dimethyl ether pentane, hexane, heptane, octane, dichloromethane, chloroform, carbon tetrachloride, dichloroethane, carbon disulfide, benzene, toluene, xylene, nitrobenzene, diethyl ether, dimethoxyethane, diglyme, triglyme, ethyl acetate, butyl acetate, dimethylformamide, dimethyl sulfoxide, 2-butanone, acetonitrile, benzonitrile, butanol, 1-propanol, 2-propanol, ethanol, methanol, and diacetone alcohol.

In particular, the organic solvent is preferably methyl isobutyl ketone, propylene glycol monomethyl ether, hexadecane, butyl acetate, acetone, 2-butanone, cyclohexanone, ethyl acetate, diacetone alcohol, ethanol, or 2-propanol.

One of the organic solvents may be used singly, or two or more may be used in combination.

The organic solvent is used in the surface-treating agent in an amount of preferably 10 to 99 mass %, more preferably 30 to 95 mass %, and even more preferably 50 to 95 mass %.

Examples of the catalyst include acids (such as hydrochloric acid, acetic acid, and trifluoroacetic acid), bases (such as ammonia, triethylamine, and diethylamine), and transition metals (such as Ti, Ni, and Sn).

The catalyst promotes hydrolysis and dehydrative condensation of the surface-treating agent and accelerates the surface-treating reaction.

The surface-treating agent of the present disclosure may further contain a compound that is represented by formula (B2') and that is obtained by opening the isocyanuric ring of the compound (B2).

(B2')

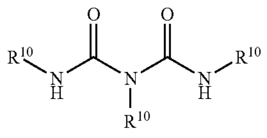

wherein two $R^{10}$ groups are $—R^{9b}—SiR^{2b}_{nb}R^{3b}_{3-nb}$ unit, and one $R^{10}$ group is $R^8$.

These silane compounds may be or may not be contained in the surface-treating agent, and when contained, may be preferably 0.01 to 20 parts by mole, and more preferably 0.1 to 15 parts by mole, such as 1 to 10 parts by mole or 3 to 5 parts by mole, based on total 100 mol of the compound (B2).

The surface-treating agent of the present disclosure may further contain a cationic silane compound. Containing a cationic silane compound, the surface-treating agent of the present disclosure can form a surface-treating layer having excellent antibacterial properties in addition to excellent liquid slipperiness and UV durability.

The cationic compound is preferably an ammonium salt type cationic silane compound, such as a cationic silane compound represented by formula ($C_1$):

$$R^{13}_{3-m}R^{12}_{m}Si—R^{15}—N^{+}R^{11}_{3}X^{-} \quad (C1)$$

wherein $R^{12}$ is each independently at each occurrence a hydroxyl group or a hydrolyzable group;

$R^{13}$ is each independently at each occurrence a hydrogen atom or a monovalent organic group;

m is an integer of 1 to 3;

$R^{11}$ is each independently a $C_{1-22}$ alkyl group;

$R^{15}$ is a single bond or a divalent organic group; and $X^-$ is $F^-$, $Cl^-$, or $Br^-$.

Below, the article of the present disclosure will be described.

The article of the present disclosure comprises a substrate and a layer (hereinafter also referred to as a surface-treating layer) on the substrate surface, the layer formed of the surface-treating agent of the present disclosure.

The substrate usable in the present disclosure may be composed of any suitable material such as glass, resin (which may be natural or synthetic resin such as a commonly used plastic material), metal, ceramics, semiconductors (such as silicon and germanium), fiber (such as woven fabric and nonwoven fabric), fur, leather, wood, pottery, stone, building materials, and sanitary articles.

For example, when the article to be produced is an optical member, the material constituting the surface of the substrate may be a material for an optical member, such as glass or a transparent plastic. When the article to be produced is an optical member, some layer (or film) such as a hard coat layer or an antireflection layer may be formed on the surface (the outermost layer) of the substrate. The antireflection layer may be any of a single-layer antireflection layer and a multi-layer antireflection layer. Examples of inorganic substances usable in the antireflection layer include $SiO_2$, SiO, $ZrO_2$, $TiO_2$, TiO, $Ti_2O_3$, $Ti_2O_5$, $Al_2O_3$, $Ta_2O_5$, $Ta_3O_5$, $Nb_2O_5$, $HfO_2$, $Si_3N_4$, $CeO_2$, MgO, $Y_2O_3$, $SnO_2$, $MgF_2$, and $WO_3$. One of these inorganic substances may be used singly, or two or more may be used in combination (e.g., as a mixture). In the case of a multi-layer antireflection layer, $SiO_2$ and/or SiO is preferably used in the outermost layer thereof. When the article to be produced is an optical glass component for a touch panel, a part of the surface of the substrate (glass) may have a transparent electrode such as a thin film in which indium tin oxide (ITO), indium zinc oxide, or the like is used. The substrate, according to its specific configuration or the like, may have an insulating layer, an adhesive layer, a protecting layer, a decorated frame layer (I-CON), an atomizing film layer, a hard coating layer, a polarizing film, a phase difference film, a liquid crystal display module, or the like.

The shape of the substrate is not limited, and may be, for example, in the form of a plate, a film, or the like. The surface region of the substrate on which a surface-treating layer is to be formed is at least a part of the surface of the substrate, and may be suitably determined according to the application, specific specification, and the like of an article to be produced.

In one embodiment, the substrate, or at least the surface portion thereof, may be composed of a material originally having a hydroxyl group. Examples of the material include glass, as well as metal (in particular, base metal) where a natural oxidized film or a thermal oxidized film is formed on the surface, ceramics, and semiconductors. Alternatively, when the substrate has an insufficient amount of hydroxyl groups or when the substrate originally has no hydroxyl group as in resin and the like, a pre-treatment may be performed on the substrate to thereby introduce or increase hydroxyl groups on the surface of the substrate. Examples of such a pre-treatment include a plasma treatment (e.g., corona discharge) and ion beam irradiation. The plasma treatment can be suitably utilized to not only introduce or increase hydroxyl groups on the substrate surface, but also clean the substrate surface (remove foreign matter and the like). Another example of such a pre-treatment is a method wherein a monolayer of a surface adsorbent having a carbon-carbon unsaturated bonding group formed on the substrate surface by a LB method (a Langmuir-Blodgett method), a chemical adsorption method, or the like beforehand, and thereafter cleaving the unsaturated bond under an atmosphere containing oxygen, nitrogen, or the like.

In another embodiment, the substrate, or at least the surface portion thereof, may be composed of a material comprising another reactive group such as a silicone compound having one or more Si—H group or alkoxysilane.

In a preferable embodiment, the substrate is glass. The glass is preferably sapphire glass, soda-lime glass, alkali aluminosilicate glass, borosilicate glass, alkali-free glass, crystal glass, or quartz glass, and is particularly preferably chemically strengthened soda-lime glass, chemically strengthened alkali aluminosilicate glass, or chemically bonded borosilicate glass.

The article of the present disclosure can be produced by forming a layer of the surface-treating agent of the present disclosure on the surface of the substrate and optionally post-treating the layer, thereby forming a layer from the surface-treating agent of the present disclosure.

The layer of the surface-treating agent of the present disclosure can be formed by applying the surface-treating agent to the surface of the substrate so as to coat the surface. The coating method is not limited. For example, a wet coating method and a dry coating method can be used.

Examples of the wet coating method include dip coating, spin coating, flow coating, spray coating, roll coating, gravure coating, and similar methods.

Examples of the dry coating method include deposition (usually, vacuum deposition), sputtering, CVD, and similar methods. Specific examples of the deposition method (usually, a vacuum deposition method) include resistive heating, high-frequency heating using electron beam, microwave or the like, ion beam, and similar methods. Specific examples of the CVD method include plasma-CVD, optical CVD, thermal CVD, and similar methods.

Furthermore, coating by an atmospheric pressure plasma method can be performed.

When using the dry coating method, the surface-treating agent of the present disclosure may be directly subjected to the dry coating method, or may be diluted with the above organic solvent before being subjected to the dry coating method.

A layer of the surface-treating agent is preferably formed such that the surface-treating agent of the present disclosure coexists in the layer with a catalyst for hydrolysis and dehydrative condensation. Conveniently, in the case of a wet coating method, the surface-treating agent of the present disclosure is diluted with a solvent, and then, immediately before application to the substrate surface, a catalyst may be added to the diluted solution of the surface-treating agent of the present disclosure. In the case of a dry coating method, the surface-treating agent of the present disclosure to which a catalyst has been added is directly used to a deposition (usually vacuum deposition) treatment, or a pellet-like material may be used to a deposition (usually vacuum deposition) treatment, wherein the pellet is obtained by impregnating a porous body of metal such as iron or copper with the surface-treating agent of the present disclosure to which the catalyst has been added.

The catalyst may be any suitable acid or base. The acid catalyst may be, for example, hydrochloric acid, acetic acid, formic acid, or trifluoroacetic acid. The base catalyst may be, for example, ammonia or organic amine.

The surface-treating layer included in the article of the present disclosure has liquid slipperiness. Moreover, the surface-treating layer may have not only high liquid slipperiness but also have, depending on the formulation of the surface-treating agent used, antibacterial properties, water-repellency, oil-repellency, antifouling properties (e.g., preventing grime such as fingerprints from adhering), waterproof properties (preventing water from entering electronic components and the like), surface lubricity (or lubricity, for example, such as removability by wiping of grim such as fingerprints, and excellent tactile sensations to the fingers), and the like, and may be suitably used as a functional thin film.

The article of the present disclosure is useful in applications where liquid slipperiness needs to be maintained even after long-term outdoor use under severe environmental conditions.

In a preferable embodiment, the article of the present disclosure is useful for glass or mirror glass for vehicles, vessels, aircrafts, or the like, such as glass for automobiles, door mirror for automobiles, or fender mirror for automobiles, or glass for use in on-board cameras. In addition, it is useful for a substrate for outdoor applications such as glass used in security cameras, and roadside mirrors.

Accordingly, the present disclosure further relates to an optical material having the surface-treating layer as the outermost layer.

The optical material preferably includes a wide variety of optical materials in addition to optical materials relating to displays and the like as exemplified below: for example, displays such as cathode ray tubes (CRTs; e.g., PC monitors), liquid crystal displays, plasma displays, organic EL displays, inorganic thin-film EL dot matrix displays, rear projection displays, vacuum fluorescent displays (VFDs), field emission displays (FEDs); protective plates for such displays; and those obtained by performing an antireflection film treatment on their surfaces.

The article of the present disclosure may be, but is not limited to, an optical member. Examples of the optical member include lenses of glasses or the like; front surface protective plates, antireflection plates, polarizing plates, and anti-glare plates for displays such as PDPs and LCDs; touch panel sheets for devices such as mobile phones and personal digital assistants; disc surfaces of optical discs such as Blu-ray (registered trademark) discs, DVD discs, CD-Rs, and MOs; optical fibers; and display surfaces of watches and clocks.

The article of the present disclosure may be medical equipment or a medical material.

The thickness of the layer is not limited. The thickness of the above layer in the case of automobile glass or a mirror is preferably in a range of, for example, 1 to 1000 nm, 1 to 500 nm, or 1 to 100 nm from the viewpoint of long-term weather resistance. In the case of an optical member, the thickness of the above layer is in a range of 1 to 50 nm, preferably 1 to 30 nm, and more preferably 1 to 15 nm, from the viewpoint of optical performance and liquid slipperiness.

The surface-treating agent and the article of the present disclosure have been described in detail above. However, the surface-treating agent, the article, and the like of the present disclosure are not limited to those exemplified above.

The present disclosure includes the following embodiments.

[1] A surface-treating agent comprising:

(A) a compound represented by the following formula (A1):

(A1)

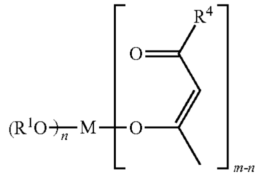

wherein

M is Al, Ca, Fe, Ge, Hf, In, Si, Ta, Ti, Sn, or Zr, $R^1$ is each independently a hydrogen atom or a $C_{1-6}$ alkyl group, $R^4$ is each independently a $C_{1-3}$ alkyl group or a $C_{1-3}$ alkoxy group, m is a valence of M, and n is 0 or more and equal to or less than the valence of M; or a compound represented by the following formula (A2):

(A2)

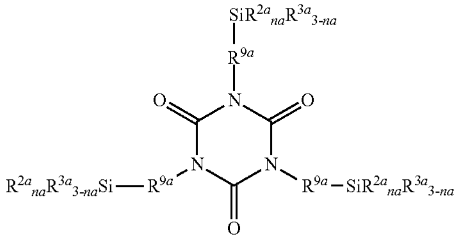

wherein $R^{2a}$ is each independently at each occurrence a hydroxyl group or a hydrolyzable group, $R^{3a}$ is each independently at each occurrence a hydrogen atom or a monovalent organic group, na is each independently an integer of 1 to 3 for each $SiR^{2a}_{na}R^{3a}_{3-na}$ unit, and $R^{9a}$ is each independently a single bond or a divalent group; and (B) a compound represented by the following formula (B1):

$$M^b(OR^{1b})_q(R^{4b})_{p-q} \quad (B1)$$

wherein $M^b$ is Al, Ca, Fe, Ge, Hf, In, Si, Ta, Ti, Sn, or Zr, $R^{1b}$ is each independently a hydrogen atom or a $C_{1-6}$ alkyl group, $R^{4b}$ is a $C_{1-30}$ alkyl group, a $C_{1-30}$ oxyalkyl group, a $C_{1-30}$ fluoroalkyl group, or a siloxane group, p is a valence of $M^b$, and q is 1 or more and equal to or less than (the valence of $M^{b-1}$); or a compound represented by the following formula (B2):

(B2)

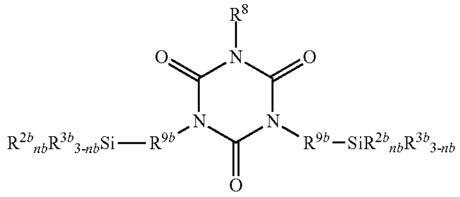

wherein $R^{2b}$ is each independently at each occurrence a hydroxyl group or a hydrolyzable group, $R^{3b}$ is each independently at each occurrence a hydrogen atom or a monovalent organic group, nb is each independently an integer of 1 to 3 for each $SiR^{2b}_{nb}R^{3b}_{3-nb}$ unit, $R^{9b}$ is each independently a single bond or a divalent group, and $R^8$ is a $C_{1-30}$ alkyl group, a $C_{1-30}$ oxyalkyl group, a $C_{1-30}$ fluoroalkyl group, a siloxane-containing group, or a perfluoropolyether-containing group, the surface-treating agent comprising at least one of the compound represented by the formula (A2) or the compound represented by the formula (B2).

[2] The surface-treating agent according to [1], wherein the compound represented by the formula (A1) is a metal alkoxide represented by the following formula (A1-1):

$$M(OR^1)_n \quad (A1\text{-}1)$$

wherein

M is Al, Ca, Fe, Ge, Hf, In, Si, Ta, Ti, Sn, or Zr, $R^1$ is each independently a hydrogen atom or a $C_{1-6}$ alkyl group, and n is a valence of M.

[3] The surface-treating agent according to [1] or [2], wherein the compound represented by the formula (A1) is a metal alkoxide represented by the following formula (A1-2):

$$Si(OR^1)_4 \quad (A1\text{-}2)$$

wherein $R^1$ is each independently a hydrogen atom or a $C_{1-6}$ alkyl group.

[4] The surface-treating agent according to any one of [1] to [3], comprising the compound represented by the formula (A2).

[5] The surface-treating agent according to any one of [1] to [4], comprising the compound represented by the formula (B2).

[6] The surface-treating agent according to any one of [1] to [5], comprising the compound represented by the formula (A2) and the compound represented by the formula (B2).

[7] The surface-treating agent according to any one of [1] to [6], comprising the compound represented by the formula (A2), the compound represented by the formula (B1), and the compound represented by the formula (B2).

[8] The surface-treating agent according to any one of [1] to [7], wherein na and nb are 3.

[9] The surface-treating agent according to any one of [1] to [8], wherein $R^{9b}$ is a $C_{1-30}$ alkyl group.

[10] The surface-treating agent according to any one of [1] to [9], wherein $R^8$ is a $C_{1-30}$ alkyl group.

[11] The surface-treating agent according to any one of [1] to [10], wherein $R^{9a}$ is a $C_{1-6}$ alkylene group.

20 [12] The surface-treating agent according to any one of [1] to [11], wherein $R^{9b}$ is a $C_{1-6}$ alkylene group.

[13] The surface-treating agent according to any one of [1] to [12], wherein a molar ratio of the component (A) to the component (B) is 0.01-100:1.

[14] The surface-treating agent according to any one of [1] to [13], further comprising one or more other components selected from an organic solvent, water, and a catalyst.

[15] An article comprising a substrate and a layer formed of the surface-treating agent according to any one of [1] to [14] on the substrate.

EXAMPLES

Below, the surface-treating agent of the present disclosure will now be described in the Examples, but the present disclosure is not limited to the following Examples.

The following compounds were prepared as components (A) and (B).

Compound (A1)

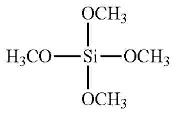

Compound (A2)

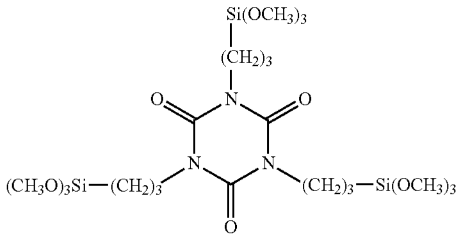

Compound (B1)

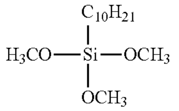

Compound (B2)

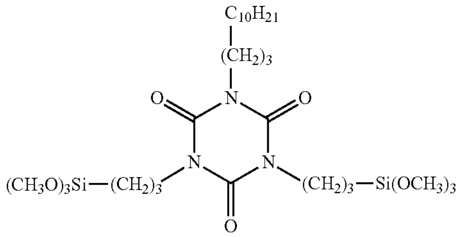

Surface-Treating Agent Preparation 1

The compound (A1), the compound (A2), the compound (B1), and the compound (B2) were dissolved in ethanol in predetermined proportions so as to be 20 wt % in total, and 0.01 N hydrochloric acid was added to this solution in a mass ratio of 0.15 to prepare surface-treating agents 1 to 10. The proportions (molar ratios) of each compound is shown in Table 1 below.

TABLE 1

| | Molar ratio | | | |
|---|---|---|---|---|
| | Compound (A1) | Compound (A2) | Compound (B1) | Compound (B2) |
| Surface-treating agent 1 | 7.5 | 2.5 | 1 | 0 |
| Surface-treating agent 2 | 5 | 5 | 1 | 0 |
| Surface-treating agent 3 | 2.5 | 7.5 | 1 | 0 |
| Surface-treating agent 4 | 0 | 10 | 1 | 0 |
| Surface-treating agent 5 | 10 | 0 | 0 | 1 |
| Surface-treating agent 6 | 0 | 10 | 0.75 | 0.25 |
| Surface-treating agent 7 | 0 | 10 | 0.5 | 0.5 |
| Surface-treating agent 8 | 0 | 10 | 0.25 | 0.75 |
| Surface-treating agent 9 | 0 | 10 | 0 | 1 |
| Surface-treating agent 10 | 10 | 0 | 1 | 0 |

Surface-Treated Sample Preparation 1

A soda lime glass substrate was spin-coated with the surface-treating agents 1 to 10 prepared above (2000 rpm for 10 seconds) to form surface-treating layers, and thereby surface-treated samples 1 to 10 were obtained. The surface-treated samples 1 to 9 are Examples 1 to 9, and the surface-treated sample 10 is Comparative Example 1. The initial sliding angle and the sliding angle after UV irradiation of the resulting surface-treated samples 1 to 10 were evaluated. The results are shown in Table 2 below.

(Method for Measuring Sliding Angle)

Water was dripped from a microsyringe onto the surface-treating layer side of a horizontally placed surface-treated sample, and the droplet was observed while tilting the sample at a rate of 2° per second up to 90°. The sliding angle was determined when the droplet traveled 5 mm. The droplet volume was set to be 20 µL, and measurement was made.

Accelerated UV Resistance Test

The surface-treated samples 1 to 10 were subjected to an accelerated UV resistance test as follows. A UVB-313 lamp (manufactured by Q-Lab, an irradiance of 0.63 $W/m^2$ at 310 nm) was used, the distance between the lamp and the surface-treating layer of the surface-treated samples was 5 cm, and the temperature of the plate on which the surface-treated samples were placed was 63° C. UVB irradiation was continuously performed, and the surface-treated samples were removed when measuring the sliding angle. Their changes were checked after 480 hours of irradiation.

TABLE 2

| | | Sliding angle (°) (Initial) | Sliding angle (°) (After 480 hours of UV irradiation) |
|---|---|---|---|
| Example 1 | Sample 1 | 16 | 37 |
| Example 2 | Sample 2 | 28 | 48 |
| Example 3 | Sample 3 | 24 | 45 |
| Example 4 | Sample 4 | 20 | 42 |
| Example 5 | Sample 5 | 19 | 35 |
| Example 6 | Sample 6 | 20 | 35 |

TABLE 2-continued

| | | Sliding angle (°) (Initial) | Sliding angle (°) (After 480 hours of UV irradiation) |
|---|---|---|---|
| Example 7 | Sample 7 | 24 | 41 |
| Example 8 | Sample 8 | 22 | 36 |
| Example 9 | Sample 9 | 16 | 33 |
| Comparative Example 1 | Sample 10 | 10 | >90 |

Surface-Treating Agent Preparation 2

The compound (A2) and the compound (B1) were dissolved in ethanol in predetermined proportions so as to be 30 wt % in total. Then, 0.01 N hydrochloric acid was added to each of these solutions in a mass ratio of 0.15 to prepare surface-treating agents 11 to 17. The proportions (molar ratios) of each compound is shown in Table 3 below. The surface-treating agent 11 has a molar ratio (A2)/(B1) of 0, meaning that it contains the compound (B1) only.

Surface-Treated Sample Preparation 2 and Evaluation

The surface-treating agents 11 to 17 prepared above were used to prepare surface-treated samples 11 to 17 according to the method of the above surface-treated sample preparation 1. Concerning the resulting surface-treated samples 11 to 17, sliding angle measurement and an accelerated UV resistance test were performed in the same manner as above. The results are shown in Table 3 below. The surface-treated sample 11 is Comparative Example 2, and the surface-treated samples 12 to 17 are Examples 10 to 15.

TABLE 3

| | | (A2)/(B1) Molar ratio | Sliding angle (°) (Initial) | Sliding angle (°) (After 480 hours of UV irradiation) |
|---|---|---|---|---|
| Comparative Example 2 | Sample 11 | 0 | 25 | >90 |
| Example 10 | Sample 12 | 1 | 26 | 35 |
| Example 11 | Sample 13 | 5 | 19 | 39 |
| Example 12 | Sample 14 | 10 | 17 | 40 |
| Example 13 | Sample 15 | 20 | 18 | 42 |
| Example 14 | Sample 16 | 40 | 20 | 49 |
| Example 15 | Sample 17 | 50 | 22 | 51 |

Adhesion Test

Adhesion of each surface-treating agent to glass was evaluated by a cross-cut test. Specifically, 11 cuts reaching the substrate were made in the test surface with a cutter to create a grid of 100 squares with 1 mm intervals between the cuts, an adhesive tape was firmly applied to the grid, and the edge of the tape was pulled at a an angle of 45°. Concerning peeling of the coating, the grid after removal of the tape received a marker pen, and portions that were stained without repelling the marker ink were regarded as defective portions. Adhesion was numerically evaluated according to the following criteria.

10 points: No squares had peeling.

8 points: Slightly peeled at the intersections of the cuts, and the area of defective portions was within 5% of the total area of the squares.

6 points: Peeled on both sides and at the intersections of the cuts, and the area of defective portions was 5% or more and less than 15% of the total area of the squares.

4 points: Partially or entirely peeled along the cuts, and the area of defective portions was 15% or more and less than 35% of the total area of the squares.

2 points: Partially or entirely peeled along the cuts, and the area of defective portions was 35% or more and less than 65% of the total area of the squares.

0 points: The area of defective portions of the cuts was 65% or more of the total area of the squares.

TABLE 4

| | Compound (A1) | Compound (A2) | Compound (B1) | Compound (B2) | Number of defective portions | Score |
|---|---|---|---|---|---|---|
| Example 4 | 0 | 10 | 1 | 0 | 5/100 | 8 points |
| Example 9 | 0 | 10 | 0 | 1 | 0/100 | 10 points |
| Comparative Example 1 | 10 | 0 | 1 | 0 | 70/100 | 0 points |

Evaluation of Surface Hardness

The surface hardness of each surface-treated sample was measured in accordance with ERICHSEN Hardness Test Pencil Model 318S (ISO1518). A table in which the results of this test are compared to approximate values of pencil hardness is as follows.

TABLE 5

| 318 Test bar | Pencil hardness Approximate value |
|---|---|
| 0.5N | 2 H-3 H |
| 1.0N | 3 H |
| 2.0N | 3 H-4 H |
| 4.0N | 6 H-7 H |

TABLE 6

| | Compound (A1) | Compound (A2) | Compound (B1) | Compound (B2) | Duration of hydrolysis (h) |
|---|---|---|---|---|---|
| Example 4 | 0 | 10 | 1 | 0 | 6 |
| | | | | | 18 |
| | | | | | 24 |
| Example 9 | 0 | 10 | 0 | 1 | 6 |
| | | | | | 18 |
| | | | | | 24 |
| Comparative Example 1 | 10 | 0 | 1 | 0 | 6 |
| | | | | | 18 |
| | | | | | 24 |
| | 0.5 N | 1.0 N | 2.0 N | 4.0 N | Judgement |
| Example 4 | ○ | ○ | X | | 3 H |
| | ○ | ○ | X | | 3 H |
| | ○ | X | X | | 2 H-3 H |
| Example 9 | ○ | ○ | ○ | X | 5 H-6 H |
| | ○ | ○ | ○ | X | 5 H-6 H |
| | ○ | X | X | | 2 H-3 H |

TABLE 6-continued

| | | |
|---|---|---|
| Comparative | X | 1 H or less |
| Example 1 | X | 1 H or less |
| | X | 1 H or less |

○: Not damaged
X: damaged

INDUSTRIAL APPLICABILITY

The surface-treating agent of the present disclosure can be suitably used in various applications.

What is claimed is:

1. A surface-treating agent comprising:

(A) a compound represented by the following formula (A1):

(A1)

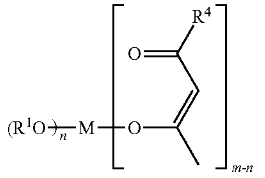

wherein

M is Al, Ca, Fe, Ge, Hf, In, Si, Ta, Ti, Sn, or Zr, $R^1$ is each independently a hydrogen atom or a $C_{1-6}$ alkyl group, $R^4$ is each independently a $C_{1-3}$ alkyl group or a $C_{1-3}$ alkoxy group, m is a valence of M, and n is 0 or more and equal to or less than the valence of M; or a compound represented by the following formula (A2):

(A2)

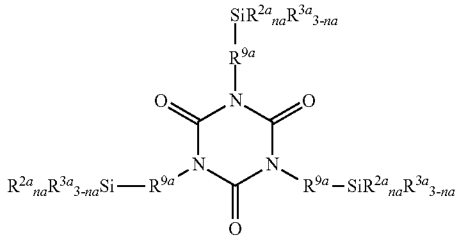

wherein $R^{2a}$ is each independently at each occurrence a hydroxyl group or a hydrolyzable group, $R^{3a}$ is each independently at each occurrence a hydrogen atom or a monovalent organic group, na is each independently an integer of 1 to 3 for each $SiR^{2a}_{na}R^{3a}_{3-na}$ unit, and $R^{9a}$ is each independently a single bond or a divalent group; and (B) a compound represented by the following formula (B1):

$$M^b(OR^{1b})_q(R^{4b})_{p-q} \quad (B1)$$

wherein $M^b$ is Al, Ca, Fe, Ge, Hf, In, Si, Ta, Ti, Sn, or Zr, $R^{1b}$ is each independently a hydrogen atom or a $C_{1-6}$ alkyl group, $R^{4b}$ is a $C_{1-30}$ alkyl group, a $C_{1-30}$ oxyalkyl group, a $C_{1-30}$ fluoroalkyl group, or a siloxane group, p is a valence of $M^b$, and q is 1 or more and equal to or less than (the valence of $M^b-1$); or a compound represented by the following formula (B2):

(B2)

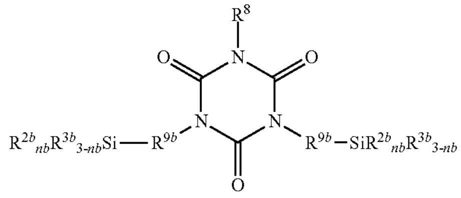

wherein $R^{2b}$ is each independently at each occurrence a hydroxyl group or a hydrolyzable group, $R^{3b}$ is each independently at each occurrence a hydrogen atom or a monovalent organic group, nb is each independently an integer of 1 to 3 for each $SiR^{2a}_{na}R^{3a}_{3-na}$ unit, $R^{9b}$ is each independently a single bond or a divalent group, and $R^8$ is a $C_{1-30}$ alkyl group, a $C_{1-30}$ oxyalkyl group, a $C_{1-30}$ fluoroalkyl group, a siloxane-containing group, or a perfluoropolyether-containing group, wherein the surface-treating agent comprises at least one of the compound represented by the formula (A2) or the compound represented by the formula (B2), and a molar ratio of the component (A) to the component (B) is 1-100:1.

2. The surface-treating agent according to claim 1, wherein the compound represented by the formula (A1) is a metal alkoxide represented by the following formula (A1-1):

$$M(OR^1)_n \quad (A1\text{-}1)$$

wherein

M is Al, Ca, Fe, Ge, Hf, In, Si, Ta, Ti, Sn, or Zr, $R^1$ is each independently a hydrogen atom or a $C_{1-6}$ alkyl group, and n is a valence of M.

3. The surface-treating agent according to claim 1, wherein the compound represented by the formula (A1) is a metal alkoxide represented by the following formula (A1-2):

$$Si(OR^1)_4 \quad (A1\text{-}2)$$

wherein $R^1$ is each independently a hydrogen atom or a $C_{1-6}$ alkyl group.

4. The surface-treating agent according to claim 1, comprising the compound represented by the formula (A2).

5. The surface-treating agent according to claim 1, comprising the compound represented by the formula (B2).

6. The surface-treating agent according to claim 1, comprising the compound represented by the formula (A2) and the compound represented by the formula (B2).

7. The surface-treating agent according to claim 1, comprising the compound represented by the formula (A2), the compound represented by the formula (B1), and the compound represented by the formula (B2).

8. The surface-treating agent according to claim 1, wherein na and nb are 3.

9. The surface-treating agent according to claim 1, wherein $R^{4b}$ is a $C_{1-30}$ alkyl group.

10. The surface-treating agent according to claim 1, wherein $R^8$ is a $C_{1-30}$ alkyl group.

11. The surface-treating agent according to claim 1, wherein $R^{9a}$ is a $C_{1-6}$ alkylene group.

12. The surface-treating agent according to claim 1, wherein Rob is a $C_{1-6}$ alkylene group.

13. The surface-treating agent according to claim 1, wherein the molar ratio of the component (A) to the component (B) is 4-50:1.

14. The surface-treating agent according to claim 1, further comprising one or more other components selected from an organic solvent, water, and a catalyst.

15. An article comprising a substrate and a layer formed of the surface-treating agent according to claim 1 on the substrate.

* * * * *